US012744043B2

(12) United States Patent
Silva

(10) Patent No.: US 12,744,043 B2
(45) Date of Patent: Sep. 22, 2026

(54) SPEECH TO TEXT SYSTEM AND DATA EXTRACTION FOR EMERGENCY RESPONDERS

(71) Applicant: Kova Corporation, Manahawkin, NJ (US)

(72) Inventor: Christopher Guy Stewart Silva, Sweetwater, NJ (US)

(73) Assignee: Kova Corporation, Manahawkin, NJ (US)

( * ) Notice: Subject to any disclaimer, the term of this patent is extended or adjusted under 35 U.S.C. 154(b) by 356 days.

(21) Appl. No.: 18/376,883

(22) Filed: Oct. 5, 2023

(65) Prior Publication Data

US 2025/0118303 A1 Apr. 10, 2025

(51) Int. Cl.
*G10L 15/26* (2006.01)

(52) U.S. Cl.
CPC .................................... *G10L 15/26* (2013.01)

(58) Field of Classification Search
None
See application file for complete search history.

(56) References Cited

U.S. PATENT DOCUMENTS 6,879,819 B2 4/2005 Brooks
7,159,230 B2 1/2007 Manson et al.
7,355,507 B2 4/2008 Binning
7,483,519 B2 1/2009 Binning
7,548,158 B2 6/2009 Titus et al.
8,175,225 B2 5/2012 Buscemi et al.
8,249,545 B2 8/2012 Dolezal et al.
8,314,683 B2 11/2012 Pfeffer
8,364,113 B2 1/2013 Ray et al.
8,368,754 B2 2/2013 Flores et al.
8,768,291 B2 7/2014 Williams et al.
8,774,752 B1 7/2014 Akcasu et al.
8,848,877 B2 9/2014 Seidberg et al.
8,923,799 B2 12/2014 Cordero
8,929,849 B1 1/2015 Dudziak
8,995,950 B2 3/2015 Williams et al.
9,131,361 B2 9/2015 Ray
9,408,046 B2 8/2016 Morin et al.
9,426,638 B1 8/2016 Johnson
(Continued)

*Primary Examiner* — Neeraj Sharma

(74) *Attorney, Agent, or Firm* — Krajec Patent Offices, LLC; Russell Krajec

(57) ABSTRACT

An emergency response communications system may identify verbal communications from a controller to first responders, then perform a speech to text conversion of the communications. From the speech to text conversion, certain parameters about the emergency situation may be extracted and used in several forms. One form may be to provide text-based alerts on signage, text-based messaging such as SMS or email messages, and to feed data into other computer-based systems, such as an incident management system. During the emergency, subsequent communications from the controller to the first responders may be captured and analyzed to identify changes to the situation, and those changes may be highlighted to the downstream consumers of the emergency information. A typical use case may be for airport emergency situations where an air traffic controller may dispatch ground-based emergency personnel in response to an inbound emergency aircraft.

20 Claims, 4 Drawing Sheets

(56) References Cited

U.S. PATENT DOCUMENTS 9,728,052 B2 8/2017 Huh et al.
9,826,358 B2 11/2017 Ryan et al.
9,849,044 B1* 12/2017 Groden .................. G05D 1/654
10,002,519 B2 6/2018 Bekanich
10,044,857 B2 8/2018 Philbin
10,182,320 B2 1/2019 Khan
10,291,777 B1* 5/2019 Luo ...................... H04M 3/5116
11,218,584 B2 1/2022 Martin et al.
11,356,833 B2 6/2022 Martin et al.
11,405,767 B2 8/2022 Brooks
11,417,154 B1* 8/2022 Moeykens ............. G07C 5/006
11,465,529 B1* 10/2022 Palombini ............. B60L 53/305
11,694,673 B2* 7/2023 Ebrahimifard .......... G10L 13/00 704/260
11,743,706 B2 8/2023 Pellegrini et al.
11,870,933 B2 1/2024 Byon et al.
11,908,553 B2 2/2024 Ferentz et al.
11,995,978 B1 5/2024 Lan
11,999,504 B2 6/2024 Bekanich
2005/0086685 A1 4/2005 Rahman et al.
2006/0015916 A1 1/2006 Yun
2007/0189328 A1* 8/2007 Judd ....................... G10L 15/26 704/E15.045
2009/0083034 A1* 3/2009 Hernandez .............. G10L 15/22 704/E15.001
2010/0158202 A1 6/2010 Johnson et al.
2010/0297980 A1 11/2010 Alberth et al.
2010/0297981 A1 11/2010 Ballantyne et al.
2011/0058659 A1 3/2011 Merlino
2011/0169634 A1 7/2011 Raj et al.
2015/0100311 A1* 4/2015 Kar ......................... G10L 15/07 704/231
2015/0111525 A1 4/2015 Crockett et al.
2016/0093302 A1* 3/2016 Bilek ...................... G10L 15/26 704/235
2016/0372117 A1* 12/2016 Klose ...................... G10L 17/00
2019/0057591 A1 2/2019 Kaoh
2020/0346751 A1 11/2020 Horelik et al.
2022/0353662 A1 11/2022 Martin et al.
2022/0377522 A1 11/2022 Martin et al.
2023/0014760 A1 1/2023 Martin
2023/0057709 A1* 2/2023 Naiman ............... G05D 1/0088
2023/0066525 A1 3/2023 Cabanas et al.
2023/0177969 A1* 6/2023 Zhuge ..................... G10L 15/22 701/120
2023/0326449 A1* 10/2023 Agarwal ............... G10L 15/193
2023/0334991 A1* 10/2023 Shapiro ................... G10L 15/22
2024/0022343 A1 1/2024 Graham et al.
2024/0048952 A1 2/2024 Seidberg et al.
2024/0098473 A1 3/2024 Ingram et al.

* cited by examiner

SPEECH TO TEXT SYSTEM AND DATA EXTRACTION FOR EMERGENCY RESPONDERS

BACKGROUND

First responders, such as firefighters at an airport facility, respond to immediate emergency situations, such as an inbound aircraft with mechanical or other trouble. Air traffic controllers treat such aircraft with high priority, and at the same time, must communicate various details to on-premise fire and rescue.

The air traffic controller's primary responsibility may be to communicate and guide the aircraft, while occasionally breaking away from the aircraft's needs to communicate the fire and rescue personnel.

In a typical emergency, an aircraft may declare an emergency. The air traffic controller may determine the type of emergency from the pilot and guide the pilot to land on one of the runways. The pilot's workload during the emergency can be overwhelming, and the pilot's adage is to aviate, navigate, and communicate, in that order. Hence, the pilot's priority is keeping the aircraft stable and airborne, navigating to a safe location, and, when there is bandwidth, communicating with air traffic control.

During an emergency, an air traffic controller's priority may be to clear other aircraft from the emergency aircraft's flight path, as well as help the pilot navigate to a safe landing. During such a period, the air traffic controller's workload is very high, as they may be changing the flight plans of other aircraft in their area, as well as helping and guiding the emergency pilot. The air traffic controller's priority is communicating and responding to the emergency aircraft's needs, and a secondary priority may be to alert and prepare ground crews for the inbound aircraft.

The emergency responders on the ground include fire and rescue. When possible, firefighters may be pre-positioned along a runway for an inbound emergency aircraft. A typical in-flight emergency may be declared minutes before the aircraft may arrive at an airport, giving the firefighters and other personnel the time to prepare and position themselves for the emergency aircraft's arrival.

Any communications between the air traffic controller and the emergency personnel during an emergency are a lower priority for the controller during a very tense and busy time. For the firefighters and other first responders, such communications are the highest priority.

SUMMARY

An emergency response communications system may identify verbal communications from a controller to first responders, then perform a speech to text conversion of the communications. From the speech to text conversion, certain parameters about the emergency situation may be extracted and used in several forms. One form may be to provide text-based alerts on signage, text-based messaging such as SMS or email messages, and to feed data into other computer-based systems, such as an incident management system. During the emergency, subsequent communications from the controller to the first responders may be captured and analyzed to identify changes to the situation, and those changes may be highlighted to the downstream consumers of the emergency information. A typical use case may be for airport emergency situations where an air traffic controller may dispatch ground-based emergency personnel in response to an inbound emergency aircraft.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Emergency Response Communications System

Figure 1:
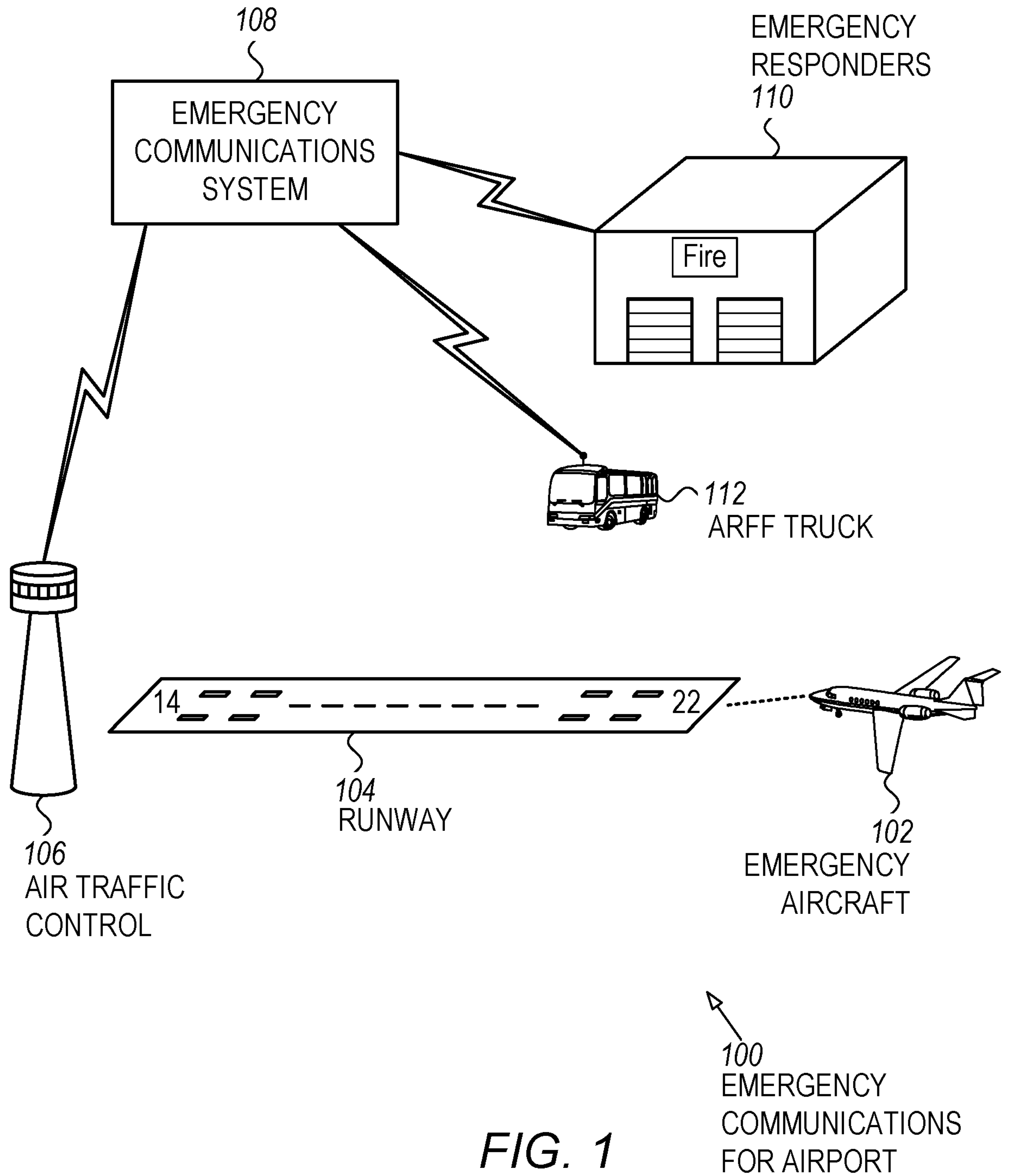
FIG. 1 is a diagram illustration of an embodiment showing emergency communications for an airport.

Emergency response communications are a critical infrastructure component. Instructions from a source of information may be shared to first responders, and those instructions may change dynamically through the course of the emergency event. For many scenarios, the source of information may be a controller who may be communicating with a participant in the event while also trying to communicate with emergency responders to the event. As a conduit of information, the controller's higher priority may be to deal with the person in the emergency, all the while trying to communicate with emergency responders who may prepare and position themselves to provide a response.

An example scenario using in this specification may be an airport emergency response system. An air traffic controller may communicate with an inbound airplane in distress. The controller's highest priority may be attending to the needs of the pilot of the emergency aircraft, then directing nearby aircraft to clear a path for the emergency aircraft. The controller, when able, may communicate with the ground-based first responders to prepare and position themselves for the arrival of the aircraft.

Aircraft rescue and firefighting (ARFF) are typically fire and rescue teams located at an airport. For large airports, there may be several ARFF stations located across the airport. ARFF personnel may respond to some emergencies with no warning, such as an aborted takeoff or a problem that may occur during landing. However, many ARFF events occur for inbound aircraft that may still be airborne.

In such events, ARFF personnel typically position themselves along a runway when the emergency aircraft lands. In such situations, firefighters and rescue personnel may be suited up, in their trucks, and located just off the runway awaiting the inbound aircraft.

The communications between the controller and the ARFF personnel may indicate the aircraft type, souls on board, fuel on board, and nature of the emergency, such as an engine failure, fire on board, landing gear trouble, and the like. The communications may also indicate the runway the pilot intends to use.

The runway used by an emergency aircraft may be an example of a piece of information that may change during an emergency. A pilot may change their desired runway due to wind and other weather conditions, as well as the pilot's need to land the aircraft as quickly as possible. During the emergency, the air traffic controller may suggest a runway, but the pilots may override the suggestion or request a specific runway.

For the ARFF responders, a change in runway may cause ARFF equipment and personnel to be at the wrong location. ARFF may begin the emergency headed for one runway, then have to reverse or change course to a different runway as the pilot and air traffic controller communicate. For larger airports, runways may be quite literally miles from each other, so designating the correct runway may be critical in positioning ARFF equipment and personnel.

An emergency response communication system may handle audio and other communications between a controller and emergency responders. Classically, audio transmissions have been used to communicate between controllers and emergency responders. For many systems, hard wired, landline connections may be used between a controller and emergency responders, as such systems may be inherently more reliable, clear, and dedicated for the communications path than wireless, or other communications paths.

Speech to Text Conversion

The emergency response communication system may perform speech to text conversions for specific communications, especially for instructions about emergency situations. From those communications, various parameters about the emergency may be extracted into text. The text-based information may be used in several manners.

Text-based information extracted from an emergency audio communication may be presented to emergency responders in a marquee display, such as a large display in a fire station. Some information may be displayed on one or more in-vehicle displays in fire trucks, ARFF response vehicles, supervisor vehicles, support vehicles, or other mobile vehicles.

The text-based information may be used in part to create SMS or text messages, email alerts, and other outbound messages to designated people associated with an emergency situation. In the example of an airport emergency system, as ARFF trucks are dispatched and rapidly moving across an airport to prepare for an inbound emergency aircraft, SMS or text messages may be sent to maintenance supervisors and personnel, ground crews, airport operations personnel, and even local hospital personnel or operational personnel at facilities under the flight path of the emergency aircraft.

Text-based data extracted from audio communications may be used to populate incident response systems. Such systems may manage and coordinate fire, rescue, medical, maintenance, and other groups of personnel during an emergency. Incident response systems may be used by emergency dispatchers to manage emergency resources in response to real-time events that may unfold during an emergency.

The data extracted from audio communications may be used to find supplemental information that may be useful during an emergency. In an example of an aircraft-related emergency, the extracted data may be used to find a radar location of the emergency aircraft and predict an estimated time of arrival. Additional information may include weather conditions, windspeed and direction, temperature, surface conditions of the runway, and the like.

With the aircraft designation, such as the aircraft call sign or flight number, the aircraft type may be determined and various parameters about the aircraft may be queried from a database. Such information may include a graphic depiction or map of the aircraft, showing the passenger locations, cargo holds, and other information which may be helpful for ARFF personnel that may enter the cabin to rescue passengers. From the aircraft type, maximum number of passengers and maximum fuel load can also be determined. In some cases, a passenger and cargo manifest may be downloaded for the specific flight.

The supplemental information derived from the text extracted from the audio communication may be summarized in several different forms and presented to various participants in the emergency response. Front line firefighters in ARFF trucks may be presented with various aircraft diagrams to help prepare for rescuing passengers and crew. Airport operations and airline personnel may be given passenger and cargo manifests to prepare for managing communications with relatives, cargo owners, and the like. In yet another example, local hospital management, police, and political authorities may be made aware of the number of potential casualties for an imminent emergency.

The examples of how the extracted data may be summarized and used are not exhaustive. But the examples highlight that the text extracted from audio may be captured, summarized, supplemented, and deployed to many different personnel and systems that may support the emergency response or otherwise may be affected or concerned by the emergency event.

Updates During an Emergency Situation

As an emergency unfolds, the data associated with the situation may change. Some information may be critical to certain personnel, such as a change to the runway designation for ARFF responders racing across the airport in a fire truck. In such situations, an emergency communications system may extract updated information and alert the ARFF responders accordingly. One such system may provide highly visual updates to in-vehicle displays, such as flashing and color indicators that the runway has changed. The change of runway may cause the ARFF trucks to change course and drive to another location on the airport.

Some information may continually change during an emergency. One example may be the estimated time of arrival or ETA. An ETA may be a countdown timer that may reflect the number of minutes and seconds for the emergency aircraft to arrive at an airport. ETA may be computed based on the aircraft's speed and location, but the ETA may change as an aircraft maneuvers prior to joining a final approach vector. Other examples of continually changing information may include windspeed and direction, radar maps of the aircraft and weather conditions, and other information.

Changes may be detected from subsequent communications from a controller to first responders. In the airport example, an air traffic controller may send a second broadcast to the first responders with updates about the status of the emergency, runway designations, ETA, and other information. In many cases, the first communication may be incomplete, and may be enough information to begin preparations and movements to designated positions on the airfield. Additional communications may clarify previous information, provide additional information, and may update or change previous information.

As subsequent audio communications are received, an emergency communications system may again perform a speech to text conversion on the subsequent communications, then may compare the newest information to previous information. In many cases, the communications system may add, enhance, or change information made available to the various stakeholders.

Some information may be subject to verification and validation prior to dissemination, while other information may be transmitted quickly without validation or confirmation. For example, ARFF may be dispatched to suit up and begin racing across the airfield with the very first indication of an upcoming emergency. However, information sent to local hospitals about potential casualties may be subject to verifying the souls on board against a passenger manifest, as well as the likelihood of the emergency resulting in injuries.

Such a system may have a set of rules, procedures, and formats for disseminating information to various stakeholders and participants. Some stakeholders, such as the ARFF trucks racing across the airfield, may be given certain information in real time or near-real time. Other stakeholders, such as local hospital management, may be updated on a delayed basis when information may be confirmed. Because each recipient may have a set of parameters that may be appropriate for that recipient, a set of rules may be similarly applied to updates to the data as the emergency evolves. In some cases, a recipient may be given an initial message concerning the emergency, then may not receive further updates until the incident has concluded.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing an emergency communication system for airports. Embodiment 100 is but one example of an emergency communication system, where an airport is an example setting. The concepts discussed in the example may be applicable to other contexts, such as communications to police, fire, medical, and other first responders in industrial, commercial, residential, military, and other contexts.

In the example of embodiment 100, an emergency aircraft 102 may be attempting a landing on runway 104. An air traffic controller 106 may be communicating with the emergency aircraft 102 using conventional radios at aircraft frequencies.

At some point during the aircraft's flight, an emergency may be communicated to air traffic controller 106. There may be several different types of aircraft emergency situations, each of which may have different procedures and responses. One group of responses to an in-flight aircraft emergency may be to have the aircraft land, but with Aircraft Rescue and Fire Fighting (ARFF) personnel and equipment nearby. A typical deployment may have fire and rescue trucks positioned on taxiways or near the anticipated runway 104 when the emergency aircraft 102 lands.

An air traffic controller's attention and priority may be directed to the emergency aircraft 102. As such, the controller may issue communications to the emergency responders 110 through an emergency communications system 108. These communications, especially at the beginning of an emergency event, may be short and may contain preliminary information which may change as the event unfolds. However, the initial communication may cause fire and rescue personnel to put on their firefighting gear, load into an ARFF truck 112 and leave for the runway 104. Time is of the essence for the ARFF truck 112 to be ready in case the emergency aircraft 102 encounters problems during landing.

As the event unfolds, the air traffic controller 108 may update the information, such as when the pilot of the emergency aircraft 102 selects a different runway or provides additional information about the situation. Often, the ARFF truck 112 may be dispatched without complete information, which may update during the event.

The emergency communications system 108 may perform a speech to text conversion of the communications between the air traffic controller 106 and the emergency responders 110. From the text derived from the audio transmission, the emergency communications system 108 may prepare messages for the emergency responders 110, the ARFF truck 112, and other affected parties. In many cases, the emergency communications system 108 may supplement the extracted text data with other data from third parties, then transmit messages with the information to devices associated with the affected parties.

During the event, there may be many other parties that may be affected by the event. Such parties may include airport operations personnel, local hospitals and medical staff, facilities in the flight path, and many more. The emergency communications system 108 may have a list of such parties, as well as templated messages for each of the parties. In many cases, a message may be created that has supplemental information derived from third party sources and put into a meaningful and useful format that may be suited for that party.

The emergency communications system 108 may prepare data that may be displayed or communicated to several different types of devices. For example, a marquee sign may be placed in a fire station so that the firefighters may gather the information as they prepare to roll out. A mobile device within the cab of the ARFF truck 112 may display incident information provided by the emergency communications system 108.

In some cases, the emergency communications system 108 may transmit SMS or text messages, emails, or other electronic messages to several different parties to alert them of the emergency event. Some systems may communicate with other computer-based systems, such as an incident management system used by fire, police, medical, or other dispatchers to manage the real time activities to respond to an emergency event.

The emergency communications system 108 may be part of an incident management system for dispatching fire, police, medical, and other first responders. In some cases, the emergency communications system 108 may be a separate system that may operate independently from such an incident management system. In such cases, the emergency communications system 108 may handle communications for alerting responsible and affected parties and getting the incident response at least partially underway, but other systems may handle the management of the incident from that point forward.

Figure 2:
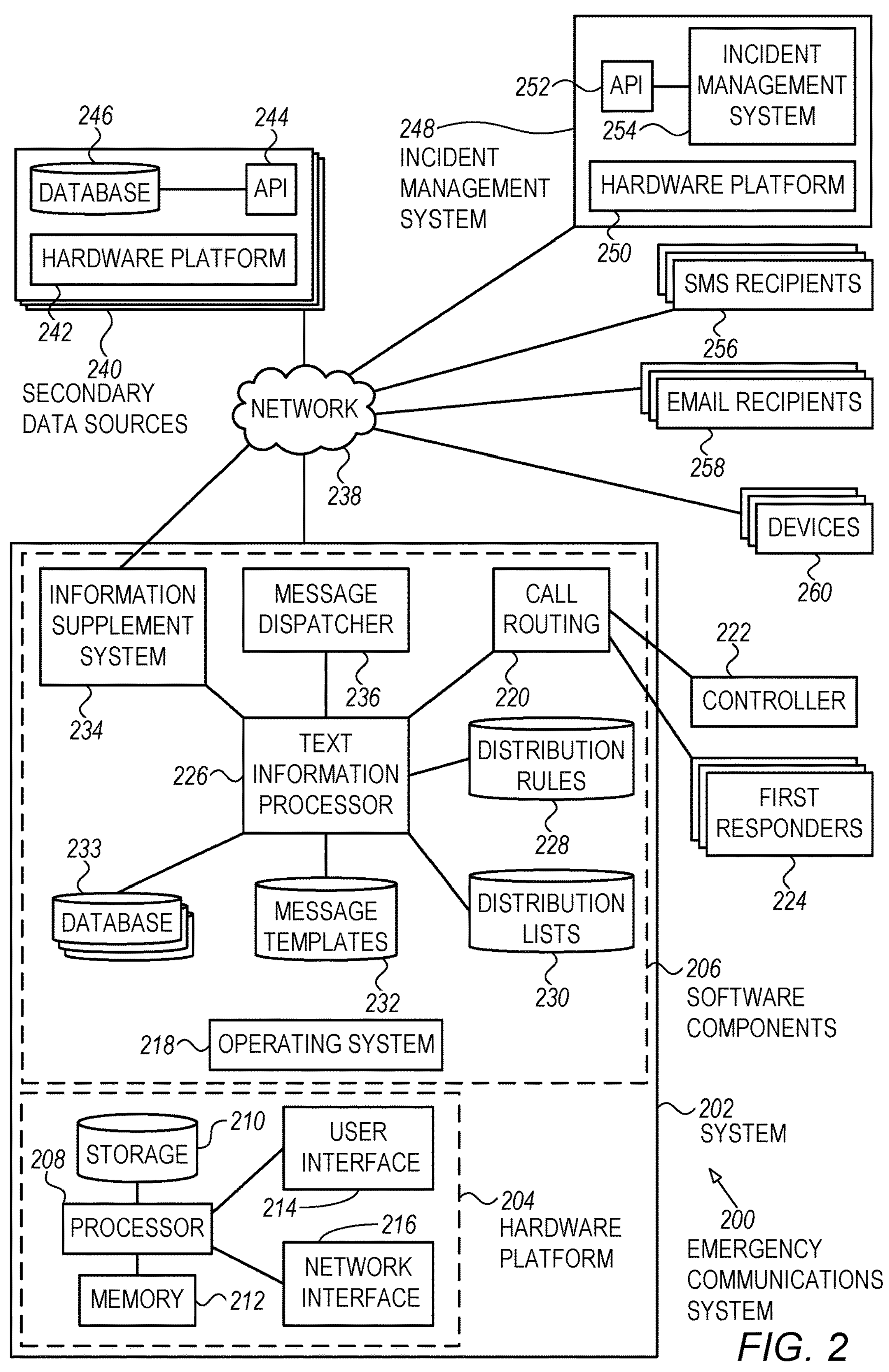
FIG. 2 is a schematic illustration of an embodiment showing an emergency communications system in a network environment.

FIG. 2 is a diagram of an embodiment 200 showing components that may manage and process communications relating to an emergency incident.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a system 202 that may have a hardware platform 204 and various software components. The system 202 as illustrated represents a conventional computing device, although other embodiments may have different configurations, architectures, or components.

In many embodiments, the system 202 may be a server computer. In some embodiments, the system 202 may still also be a desktop computer, laptop computer, netbook computer, tablet or slate computer, wireless handset, cellular telephone, game console or any other type of computing device. In some embodiments, the system 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A call routing system 220 may route and intercept calls between a controller 222 and one or more first responders 224. In the case of an airport-based system, most communications between an air traffic controller and emergency responders may be made through hard-wired, landline connections. Other systems may use wireless, conventional telephone, internet-based, or other communications network. The call routing system 220 may monitor and intercept the communications, and when a trigger occurs, a text information processor 226 may perform a speech to text conversion and perform several other functions.

A trigger may start the monitoring and analysis of communications between the controller 222 and first responders 224. In a hard-wired system, a trigger may be in the form of an electronic connection between the controller 222 and first responders 224. For example, lifting a physical telephone handset to initiate a call may serve as a trigger. Some systems may have one or a series of buttons that may establish a communication path and trigger an emergency event. For example, an air traffic controller may have a button that indicates an emergency event has started. Some systems may have additional buttons so that the air traffic controller can communicate the type of emergency, runway location, or other information very quickly, even though the air traffic controller may be talking with aircraft or other personnel.

The text information processor 226 may perform a speech to text conversion to extract various key emergency parameters from the audio communication. Key emergency parameters may include the nature of the emergency, the callsign or other indicator of the aircraft involved, intended runway, souls on board, fuel on board, aircraft position, estimated time of arrival, and any other information. This example may be appropriate for inflight aircraft emergencies, however, each use case for the emergency communications system 200 may have key emergency parameters tailored to that use case and the specific emergencies handled by the system.

The main function of the text information processor 226 may be to create and transmit messages for each of many different types of personnel that may be affected by the emergency. Further, the system may monitor additional communications between the controller 222 and the first responders 224 to identify updated or additional parameters that may be transmitted to the various affected personnel.

In some cases, the text information processor 226 may receive communications between the controller 222 and a party in the emergency, such as between an air traffic controller and an emergency aircraft. From such communications, the system 202 may extract additional information from the conversation and transmit or update key emergency parameters.

A set of distribution rules 228 and distribution lists 230 may be processed to determine whether or not to alert specific people based on the key emergency parameters that are currently known. Some recipients may have specific parameters transmitted as quickly as possible, while other recipients may have information transmitted when the parameters have been validated and verified, or the information is more complete. Such rules may be defined in the distribution rules 228. The distribution lists 230 may include the addresses and sequences of persons who may be notified based on the distribution rules 228.

A set of message templates 232 may include any standardized formats for communications in various situations. In many cases, the message templates may include placeholders for key emergency parameters, data looked up from various databases 233, data from third parties, or other information related to the incident.

Key emergency parameters may be used as a starting point to look up additional information that may be useful to an affected person. For example, a key emergency parameter for an aircraft emergency may include the callsign. From the callsign, a lookup to a local database 233 or through an information supplement system 234 may fetch data from local or remote databases to determine the airplane type, configuration, maximum number of passengers and crew, maximum weight, maximum fuel capacities, and other information that may be relevant to ARFF responders, for example.

An information supplement system 234 may send messages across a network 238, which may include the Internet, to various secondary data sources 240. The secondary data sources 240 may have a hardware platform 242 on which an application programming interface 244 operates, as well as a database 246. Such third party data sources may supplement messages provided to various affected users.

For example, an information supplement system 234 may retrieve current and predicted weather conditions, radar showing an emergency airplane's flight and current position, as well as other information. Such additional information may be incorporated into messages transmitted to various affected parties. In one example, messages transmitted ARFF personnel and displayed in an ARFF vehicle may include radar of an emergency aircraft's position, as well as weather information, alongside parameters extracted from or derived from the intercepted audio communications of an air traffic controller.

An incident management system 248 may be one example of a computer system that may receive messages from the system 202 regarding an emergency incident. Using data contained in or derived from a speech to text conversion of a controller's communication, a host of incident-related parameters may be gathered and transmitted to an incident management system 248. The information may partially or completely populate an incident managed by the incident management system 248. The incident management system 248 may have a hardware platform 250 on which an application programming interface 252 and an incident management system 252 may run. Such a communication may be one example of a computerized communication or message generated in response to a speech to text conversion and related to an emergency event.

The system 202 may communicate to the various stakeholders to SMS recipients 256, email recipients 258, and various devices 260. An SMS recipient 256 may receive text-based messages to a mobile phone or other device using the SMS text message standard. Email recipients 258 may receive messages via email, while various devices 260 may receive information in a format appropriate for the device.

In some cases, a dedicated app may operate on a mobile device, where the dedicated app may provide messages, information, and communication from the system 202. In one such version, a cellular telephone may execute an app which may connect to the system 202 to display current or historical information about an event, replay audio communications, observe and browse the status of personnel involved in the event, and other functions.

Figure 3:
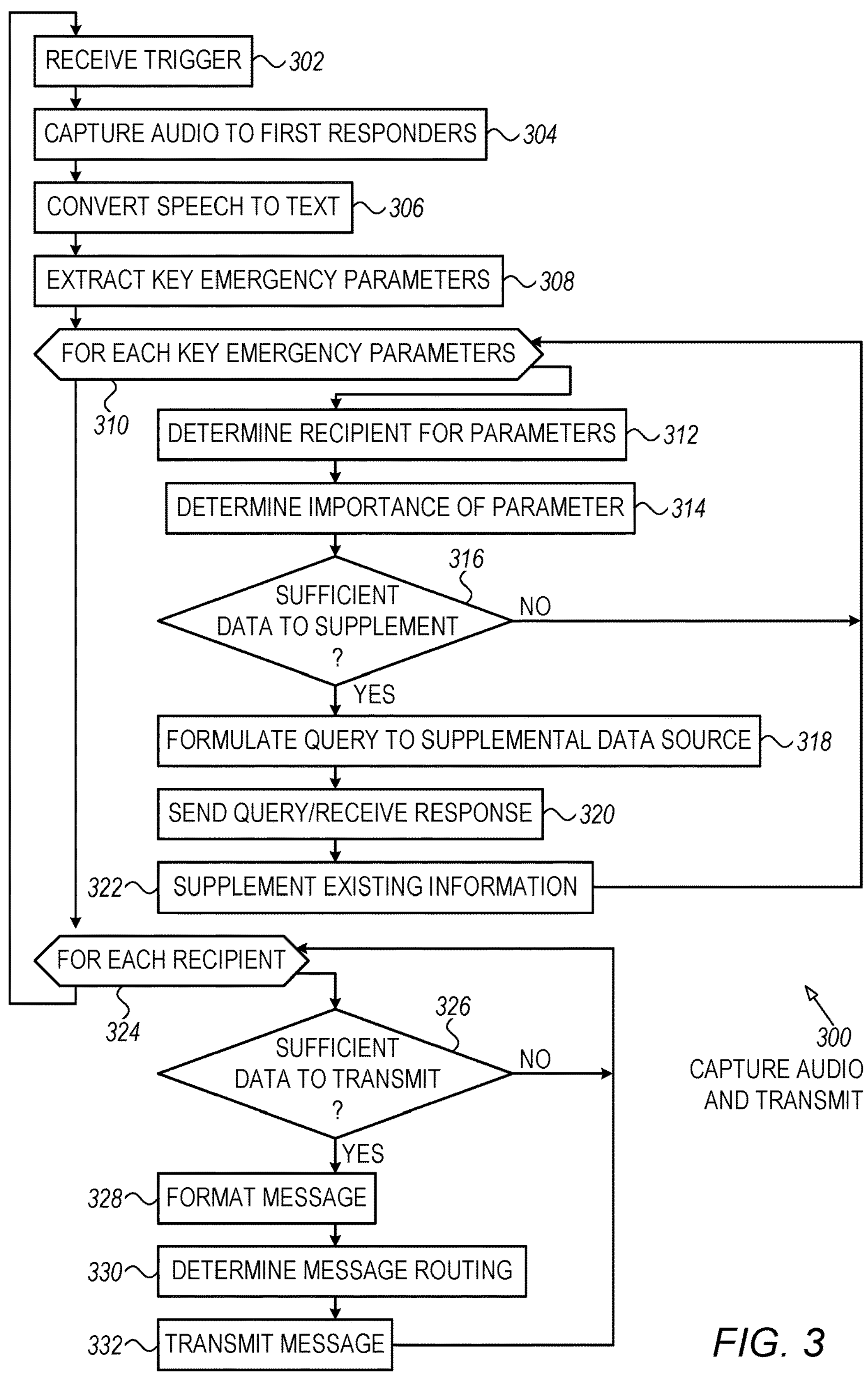
FIG. 3 is a flowchart illustration of an embodiment showing a method for capturing and transmitting messages.

FIG. 3 is a flowchart illustration of an embodiment 300 showing a method performed by an emergency communications system. The method of embodiment 300 may be one example of capturing an audio communication, performing a speech to text conversion, extracting key emergency parameters from the audio communication, and preparing and sending messages based on the extracted information. The information may also be augmented or supplemented by internal and external data sources.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In block 302, a trigger may be received. A trigger may be any input that may cause an emergency communications system to begin the analysis and processing of an audio communication. In some systems, a physical switch may be activated by a controller to trigger the system. In other systems, an audio monitoring system may monitor the controller's communications to other parties, such as communications with a distressed aircraft, to trigger monitoring for a potential emergency communication.

An audio communication may be captured in block 304. Most systems may capture and process communications between a controller and first responders for analysis, some systems may capture and analyze other audio communications as well.

The audio communications may be converted from speech to text in block 306, and various key emergency parameters may be extracted from the speech to text conversion in block 308.

For each key emergency parameter in block 310, the recipient of the parameter may be determined and assigned in block 312, as well as the importance of the parameter in block 314.

If there is sufficient data present to supplement the existing data in block 316, a query may be formulated for a database in block 318. The query may be transmitted and results received in block 320. The results may be used to supplement the existing data in block 322. If there is not sufficient data to supplement the existing data in block 316, the process may proceed back to block 310 to process the next parameter.

After processing all the key emergency parameters in block 310, each recipient may be processed in block 324.

For each recipient in block 324, if there is sufficient data to transmit to the recipient in block 326, a message may be populated and formatted in block 328. The formatting may include processing, summarizing, or analyzing extracted and supplemented data into a form suitable for the specific recipient.

The routing for the message may be determined in block 330, and the message may be sent in block 332. The routing analysis of block 330 may determine whether the message may be sent via internet communications, wireless, SMS, email, or whatever routing may be appropriate for the message, receiving device, and intended recipient.

Figure 4:
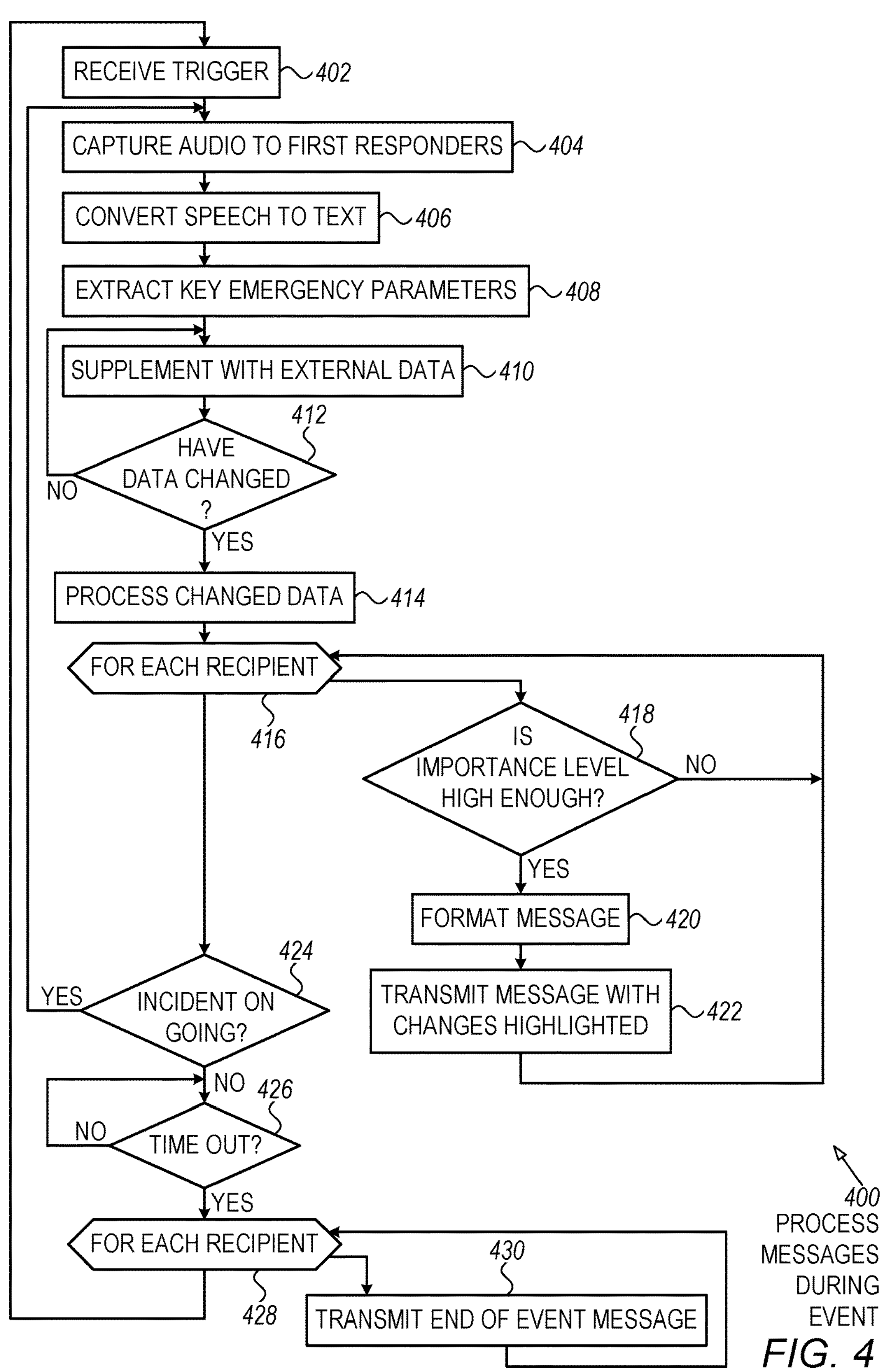
FIG. 4 is a flowchart illustration of an embodiment showing a method for processing messages during emergency events.

FIG. 4 is a flowchart illustration of an embodiment 400 showing a method performed by an emergency communications system. The method of embodiment 400 may be another example of capturing an audio communication, performing a speech to text conversion, extracting key emergency parameters from the audio communication, and preparing and sending messages based on the extracted information. The method of embodiment 400 may include procedures for updating information dynamically during the emergency event, as well as winding up or terminating the event.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A trigger may be received in block 402, which causes an audio communication to be captured in block 404. The audio may be converted using a speech to text analysis in block 406 to extract key emergency parameters in block 408. The parameters may be supplemented with external data in block 410, an example of which may be found in FIG. 3.

If the data have not changed in block 412, the process may return to block 404 to monitor further communications.

If the data have changed in block 412, the changed data may be processed in block 414. The processing of block 414 may involve querying external and internal data sources for updated information, as well as identifying which recipient may be affected by the updated data and the importance level of the parameter to that recipient.

For each recipient in block 416, if the importance level is not high enough in block 418, the process may revert back to block 416.

If the importance level is high enough in block 418, an updated message may be formatted in block 420 and transmitted in block 422. In some instances, the same message format will be used for the original and updated information. In other instances, updated information may be transmitted in a different format that may highlight the changes.

If the incident is ongoing in block 424, the process may continue to block 404 to continue monitoring communications. If the incident is no longer ongoing in block 424, the system may enter a timeout period in block 426. Once the timeout period has completed in block 426, each recipient in block 428 may receive an end of event message in block 430.

The foregoing description of the subject matter has been presented for purposes of illustration and description. It is not intended to be exhaustive or to limit the subject matter to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

I claim:

1. A system comprising:

a processor;

said processor configured with instructions to perform a method comprising:

receiving a trigger of an emergency event;

receiving a first voice communication from a controller to an emergency responder;

extracting a first set of key emergency parameters from said first voice communication using a speech to text analyzer, said first set of key emergency parameters being text-based parameters; and displaying said first set of key emergency parameters on a first display to said emergency responder;

receiving a second voice communication from said controller to said emergency responder;

extracting a second set of key emergency parameters from said second voice communication using said speech to text analyzer;

comparing said second set of key emergency parameters to said first set of key emergency parameters to identify a first changed key emergency parameter; and displaying said first changed key emergency parameter on said first display;

determining an importance category for said first changed key emergency parameter; and modifying said displaying said first changed key emergency parameter based on said importance category:

said controller being an air traffic controller and said emergency event involving an aircraft.

2. The system of claim 1, said method further comprising:

transmitting said first set of key emergency parameters to an incident management system.

3. The system of claim 2, said method further comprising: causing said incident management system to initiate a new incident based on said transmitting said first set of key emergency parameters.

4. The system of claim 2, said method further comprising: transmitting said first changed key emergency parameter to said incident management system.

5. The system of claim 1, said method further comprising: transmitting a first query to a first supplemental data source, said first query comprising at least one parameter derived from said first set of key emergency parameters;

receiving a response from said first supplemental data source; and displaying at least a portion of said response on said first display.

6. The system of claim 5, said response comprising at least one of a group composed of:

weather information;

windspeed and direction;

radar location of said aircraft; and estimated time of arrival of said aircraft.

7. The system of claim 1, said first set of key emergency parameters comprising at least one of a group composed of:

runway designation;

number of souls onboard;

amount of fuel onboard;

aircraft call sign;

aircraft type; and incident type.

8. The system of claim 1, said first display being one of a group composed of:

a fixed-mounted display;

a vehicle-mounted display;

an SMS text message; and an email message.

9. The system of claim 1, said method further comprising: playing said first voice communication message over a public address system.

10. The system of claim 1, said trigger comprising at least one of a group composed of:

establishing a communication channel from said controller to said emergency responders;

receiving an input from an emergency situation button having been pressed by said controller;

detecting said emergency event from audio to text conversion of communications between said controller and said aircraft.

11. A method performed on at least one computer processor, said method comprising:

receiving a trigger of an emergency event;

receiving a first voice communication from a controller to an emergency responder;

extracting a first set of key emergency parameters from said first voice communication using a speech to text analyzer, said first set of key emergency parameters being text-based parameters; and displaying said first set of key emergency parameters on a first display to said emergency responder;

receiving a second voice communication from said controller to said emergency responder;

extracting a second set of key emergency parameters from said second voice communication using said speech to text analyzer;

comparing said second set of key emergency parameters to said first set of key emergency parameters to identify a first changed key emergency parameter; and displaying said first changed key emergency parameter on said first display;

determining an importance category for said first changed key emergency parameter; and modifying said displaying said first changed key emergency parameter based on said importance category;

said controller being an air traffic controller and said emergency event involving an aircraft.

12. The method of claim 11 further comprising:

transmitting said first set of key emergency parameters to an incident management system.

13. The method of claim 12 further comprising:

causing said incident management system to initiate a new incident based on said transmitting said first set of key emergency parameters.

14. The method of claim 12 further comprising:

transmitting said first changed key emergency parameter to said incident management system.

15. The method of claim 11 further comprising:

transmitting a first query to a first supplemental data source, said first query comprising at least one parameter derived from said first set of key emergency parameters;

receiving a response from said first supplemental data source; and displaying at least a portion of said response on said first display.

16. The method of claim 15, said response comprising at least one of a group composed of:

weather information;

windspeed and direction;

radar location of said aircraft; and estimated time of arrival of said aircraft.

17. The method of claim 11, said first set of key emergency parameters comprising at least one of a group composed of:

runway designation;

number of souls onboard;

amount of fuel onboard;

aircraft call sign;

aircraft type; and incident type.

18. The method of claim 11, said first display being one of a group composed of:

a fixed-mounted display;

a vehicle-mounted display;

an SMS text message; and an email message.

19. The method of claim 11 further comprising:

playing said first voice communication message over a public address system.

20. The method of claim 11, said trigger comprising at least one of a group composed of:

establishing a communication channel from said controller to said emergency responders;

receiving an input from an emergency situation button having been pressed by said controller;

detecting said emergency event from audio to text conversion of communications between said controller and said aircraft.

* * * * *